United States Patent Office.

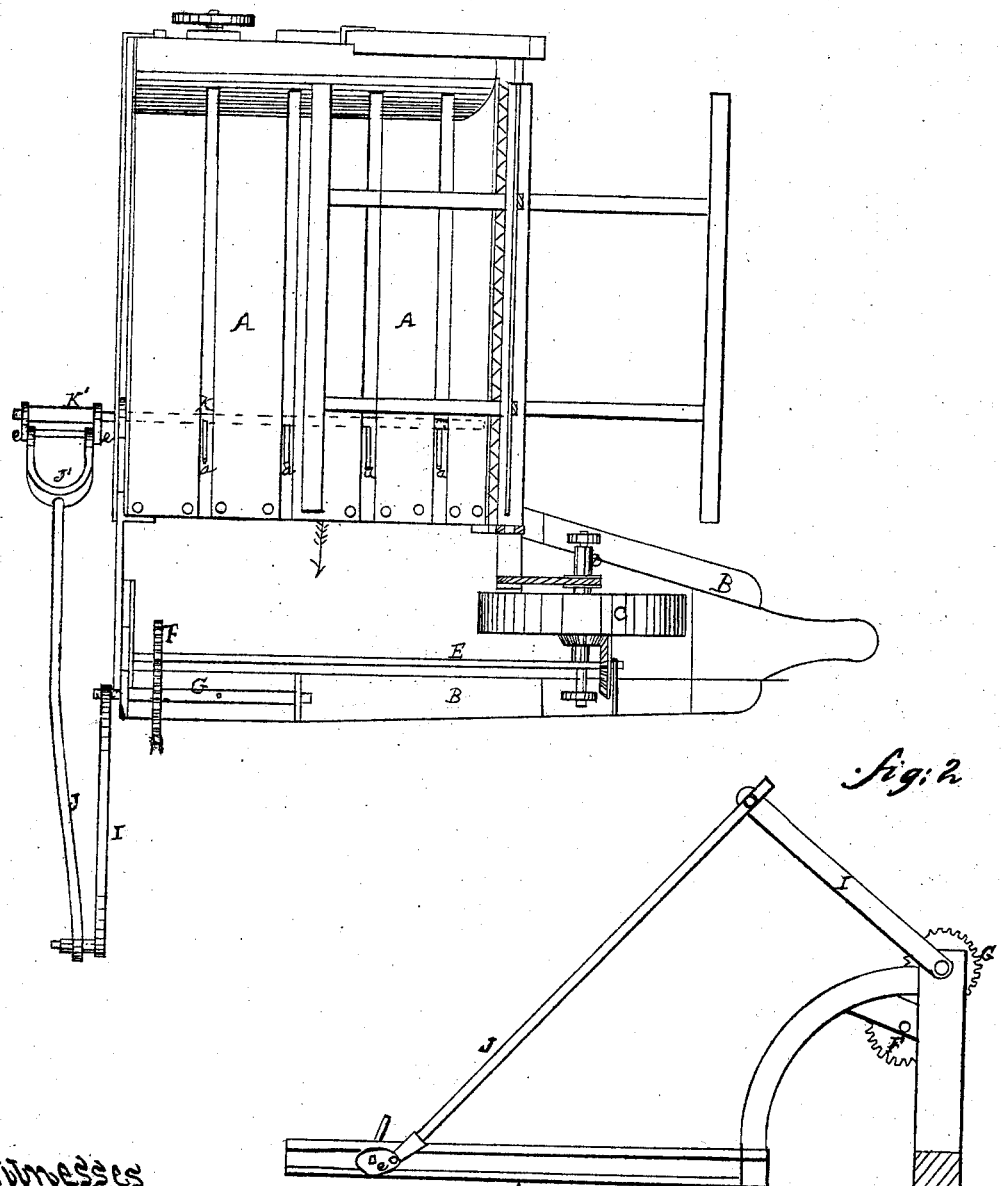

EDWARD STEWART, OF FORT MADISON, IOWA.

Letters Patent No. 72,109, dated December 10, 1867.

IMPROVEMENT IN HARVESTER-RAKES.

The Schedule referred to in these Letters Patent and making part of the same.

TO ALL WHOM IT MAY CONCERN:

Be it known that I, EDWARD STEWART, of Fort Madison, in the county of Lee, and in the State of Iowa, have invented certain new and useful Improvements in Combined Rake and Harvester; and do hereby declare that the following is a full, clear, and exact description thereof, reference being had to the accompanying drawings and to the letters of reference marked thereon.

In the annexed drawings, making part of this specification, B represents a portion of the frame of the machine; A represents the platform upon which the grain falls after being cut. This platform is made double, the upper side being composed of slats, placed at a suitable distance apart, and above the lower side. Between these two portions of the platform is placed a shaft, K, which is provided with a series of teeth, a a, which said teeth project through the openings between the slats when raking the grain from the platform, but fall beneath them when not raking.

The shaft K is operated as will now be described. The shaft D of the driving-wheel C is provided with a bevel-wheel, which works into a bevel-wheel on the shaft E, giving said shaft a rotary motion.

Shaft E has a gear-wheel, F, which works into a gear-wheel, H, on shaft G, giving a rotary motion to said shaft.

Shaft G is provided at one end with a crank, I, and to this crank is connected a pitman, J. The pitman has a divided end, as seen at J'. e e represent two short arms, which are connected to a box, K', which fits snugly over the outer end of the shaft K. The divided end of the pitman is pivoted between the two arms e e, and thus a connection is formed between the shaft K and the driving-wheel.

The pitman J gives a reciprocating motion to the shaft K, as also a partial rotary motion backwards and forwards. For every revolution of the crank I the pitman moves the shaft from one side of the platform to the other and back again, causing it to make a quarter revolution each way. When the pitman draws the shaft K towards the arrow, its teeth a a project through the openings between the slats, and catching the grain, they rake it from the platform. When the pitman moves this shaft back again, it partially rotates it, so that its teeth drop beneath the slats and pass under the grain. By suitable gearing this rake may be operated as slowly or as fast as may be required.

Having thus fully described my invention, what I claim as new, and desire to secure by Letters Patent, is—

The arrangement of the shafts D, E, and G, with their respective wheels, crank I, and pitman J, with its divided end J', connecting the arms e e upon the box K' at the end of shaft K, the whole constructed and operating substantially as and for the purposes specified.

In testimony that I claim the foregoing, I have hereunto set my hand, this 8th day of July, 1867.

EDWARD STEWART.

Witnesses:
W. D. TAYLOR.
R. H. HEATH.